INVENTORS
WILMER E. FUNK
EUGENE R. MARTIN

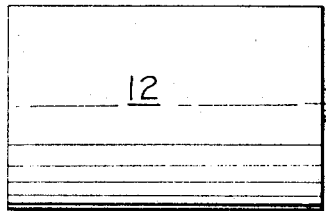
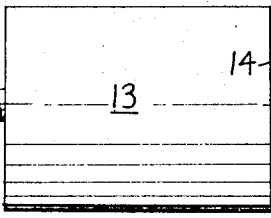
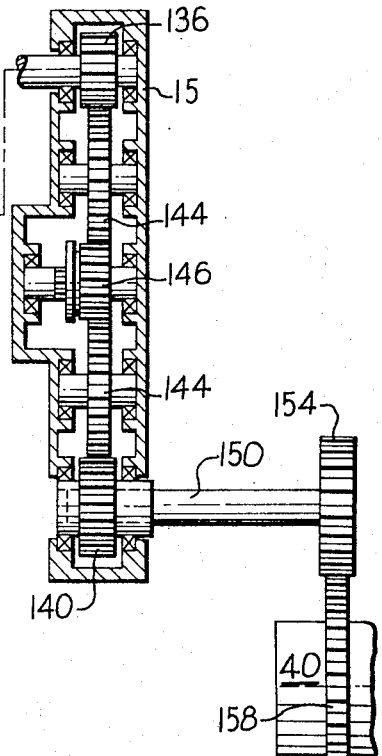
Fig. 4
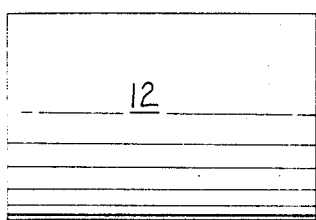
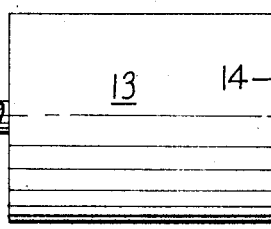
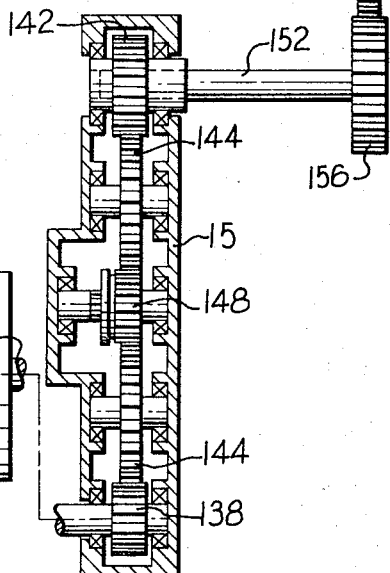
INVENTORS
WILMER E. FUNK
EUGENE R. MARTIN

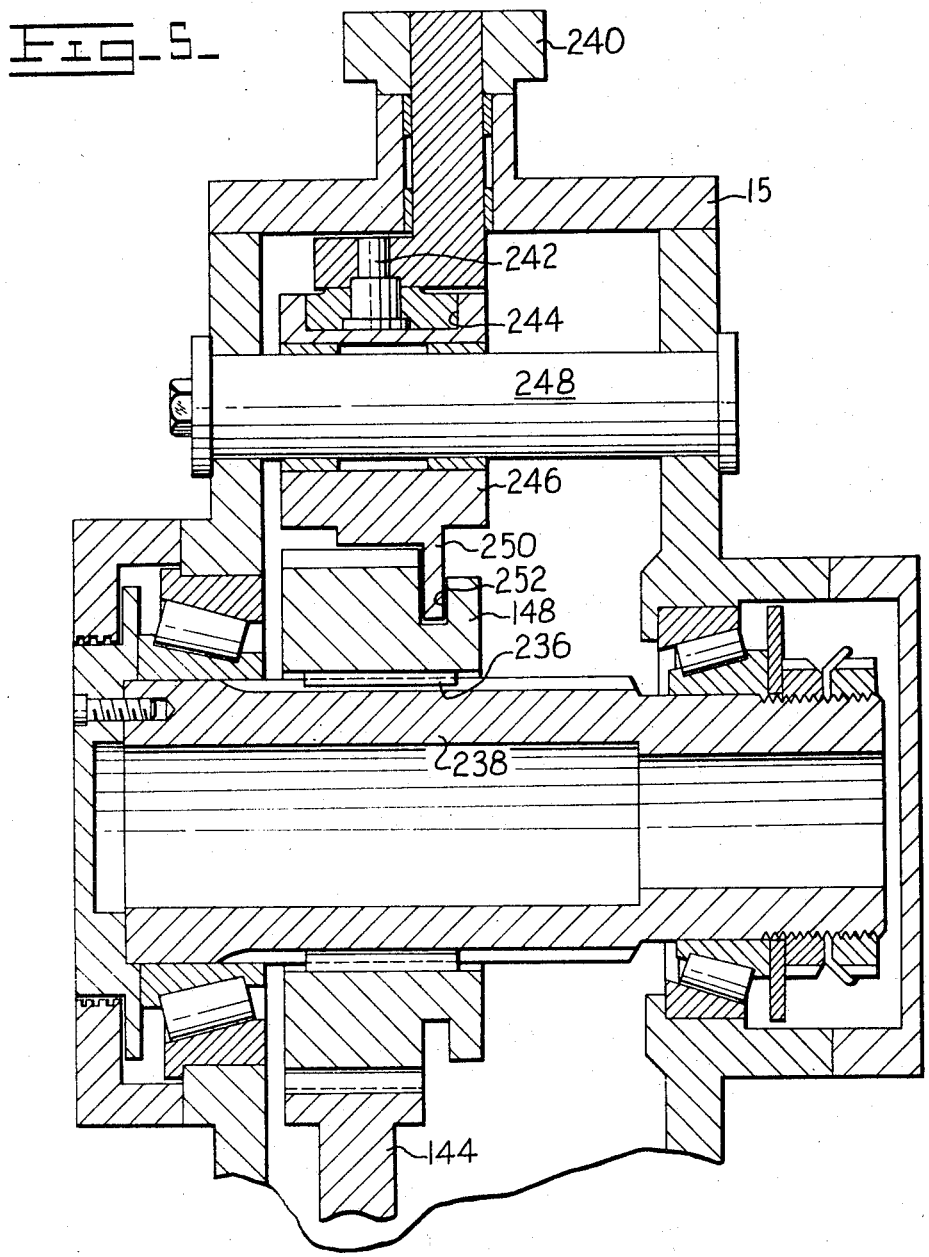
Fig-5-
INVENTORS
WILMER E. FUNK
EUGENE R. MARTIN
ATTORNEYS

United States Patent Office 3,450,325
Patented June 17, 1969

3,450,325
MULTIDRIVE FOR BONDING MACHINE
Wilmer E. Funk, Roanoke, and Eugene R. Martin, East Peoria, Ill., assignors to Caterpillar Tractor Co., Peoria, Ill., a corporation of California
Filed July 20, 1967, Ser. No. 654,880
Int. Cl. B23k 27/00
U.S. Cl. 228—2
5 Claims

ABSTRACT OF THE DISCLOSURE

Improved friction bonding construction having a multi-drive spindle arrangement with disconnect mechanisms to adapt the machine for welding parts having widely varying diameters.

Background of the invention

This invention relates to bonding machines of the kind wherein two parts to be bonded are engaged in rubbing contact at a common interface to heat the interface to a bondable condition. The invention has particular application to a bonding machine of the general type wherein the energy required to bring the interface to a bondable condition is stored as kinetic energy in rotating inertial weights. These weights take the form of annular flywheels and are connected to one of the parts and the entire energy necessary to form the bond is stored in the weights prior to engagement of the parts at the interface. The stored energy is discharged into the interface through the frictional heating and plastic working developed at the interface as the rubbing contact slows the rotating inertial weights to a stop at the conclusion of the bonding cycle.

A bonding machine should be capable of producing bonds between parts of varied sizes, shapes and materials. Different materials and different sizes and shapes of parts require different amounts of energy. The size of the inertial weight must be matched to the size, shape and composition of the parts to be bonded.

It will be understood that the welding of larger parts requires a drive arrangement of considerable maximum horsepower and torque capacity. In order for such a machine to have sufficient capacity to bond a wide range of varying size parts, it has been found that in many instances the drive train per se required for bonding larger parts results in inertial masses in excess of that required for the bonding of smaller parts even with the flywheels disconnected from the rotating spindle.

For the above reasons, the primary advantage and object of the present invention is the provision of a drive arrangement which has the torque capacity for bonding large parts and which also permits portions thereof to be disconnected to reduce the inertial mass of the rotating components when smaller parts are bonded.

A related and more specific object of the invention is the provision of a friction welder having a plurality of drive motors selectively connectible to a spindle through a plurality of electromagnetic or water cooled eddy-current couplings and a plurality of drive transmissions.

A still further object of the invention relates to disconnect means in the drive transmissions for disconnecting portions of either of the drive arrangements from the spindle to reduce the inertial mass of the rotating components when welding relatively small parts.

Other and further objects of the present invention will be apparent from the following description and claims and are illustrated in the accompanying drawings which, by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

Brief description of the drawings

FIG. 4 is a plan view, partly broken away, illustrating the inter-relationship between the various dual drive components; and FIG. 5 is a cross-sectional view taken on the line V—V of FIG. 3.

Description of the preferred embodiments

Figure 1:
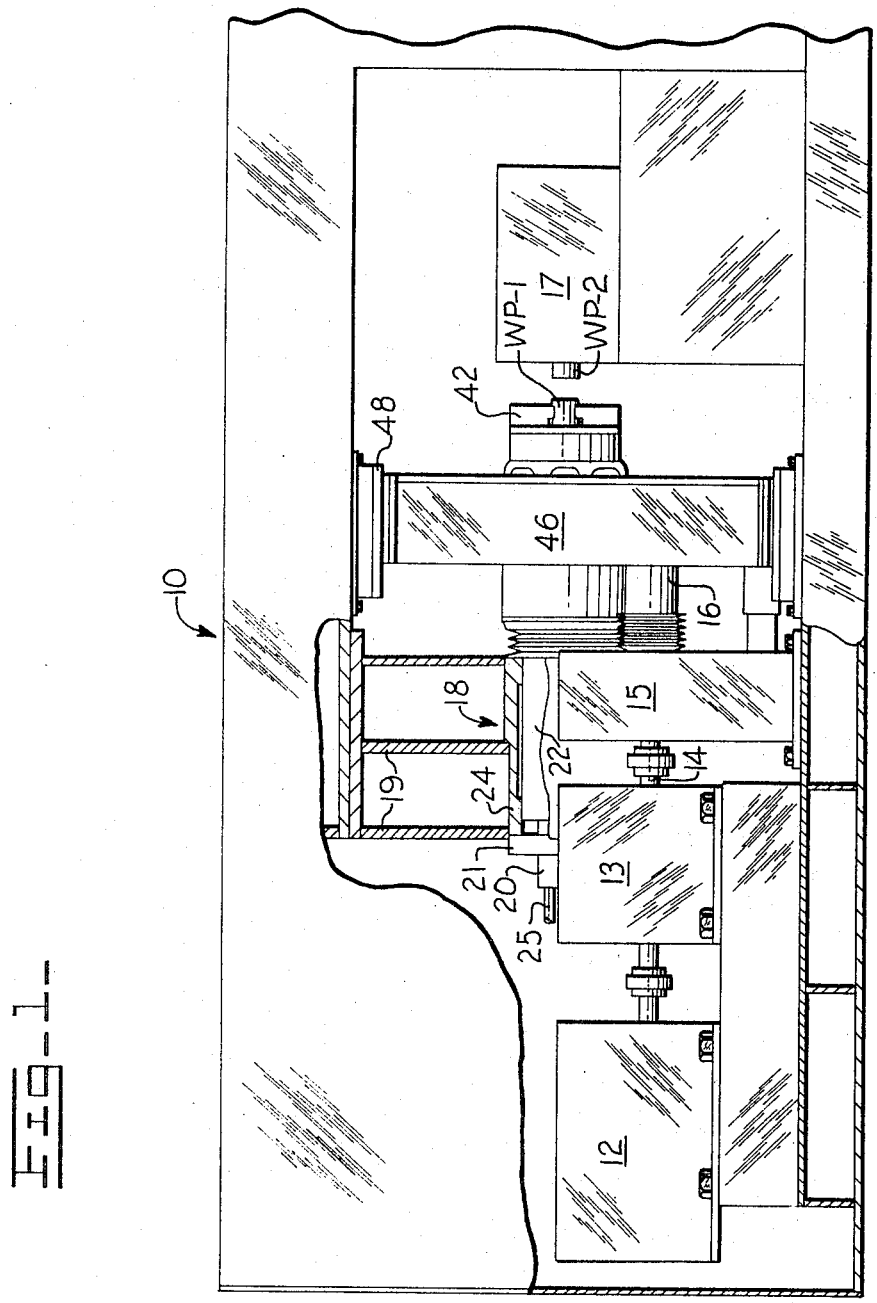
FIG. 1 is a side elevation, partly broken away, illustrating a bonding machine constructed in accordance with one embodiment of the present invention.

FIG. 1 illustrates a preferred embodiment in which the invention is employed in a horizontally oriented bonding machine shown generally at 10. In the embodiment shown in FIG. 1, a pair of electric motors, one of which is shown at 12, are drivingly connected to the input side of a pair of electromagnetic or water-cooled eddy-current couplings 13. While the invention is specifically described with respect to a dual drive, it is to be understood that a greater number of such drives could be incorporated without departing from the scope of the invention. The output sides of electromagnetic or eddy-current couplings 13 are drivingly connected by shafts 14 to the input shafts of a pair of gear transfer mechanisms 15. It should be recognized that these eddy-current couplings, while preferred, could be eliminated such that the motors 12 are directly connected to the gear transfer mechanisms 15. However, in actual operation of the device it has been found desirable to use such a coupling to prevent heat build-up in the motor due to the frequency of starting and stopping during production operations.

The output shafts of transfer mechanisms 15 extend through telescopic housing 16 into the spindle and flywheel housing 46. A gear carried on the end of the transfer mechanism output shaft meshes with a suitable gear on the spindle for driving the spindle and an associated rotary chuck 42 thereby providing relative rotation between a first workpiece WP–1 and a second workpiece WP–2. The workpiece WP–2 may be held stationary in any suitable fixture as illustrated at 17.

The rotary chuck 42 and the flywheel and spindle housing 46 are axially movable with respect to the remainder of the machine for bringing the workpieces WP–1 and WP–2 into contact under pressure for bonding. Such axial movement of the spindle assembly is accomplished by a load cylinder mechanism indicated generally at 18, which mechanism is supported within the machine framework 19. Broadly, the mechanism comprises a rod and piston assembly 20 which is secured to the machine framework 19 by a flange 21. The piston end of the assembly 20 extends into an axially movable cylinder 22, the right end of which is connected to the spindle assembly. Cylinder 22 slidably surrounds the rod and piston assembly 20 and is reciprocably mounted in a cylindrical portion 24 of the machine frame. Fluid may be introduced to chambers in either end of cylinder 22 through a pair of passages, one of which is shown at 25.

It should be apparent that when fluid pressure is communicated to the head end of cylinder 22 the spindle assembly will be moved rightwardly as viewed in FIG. 1 to bring the parts to be bonded into contact under pressure. After the bonding operation is completed and the bonded assembly has been removed from fixture 17, fluid under pressure may be communicated to the rod end of the cylinder 22 for moving the cylinder and spindle assembly to the left in ready position for another bonding operation.

Figure 2:
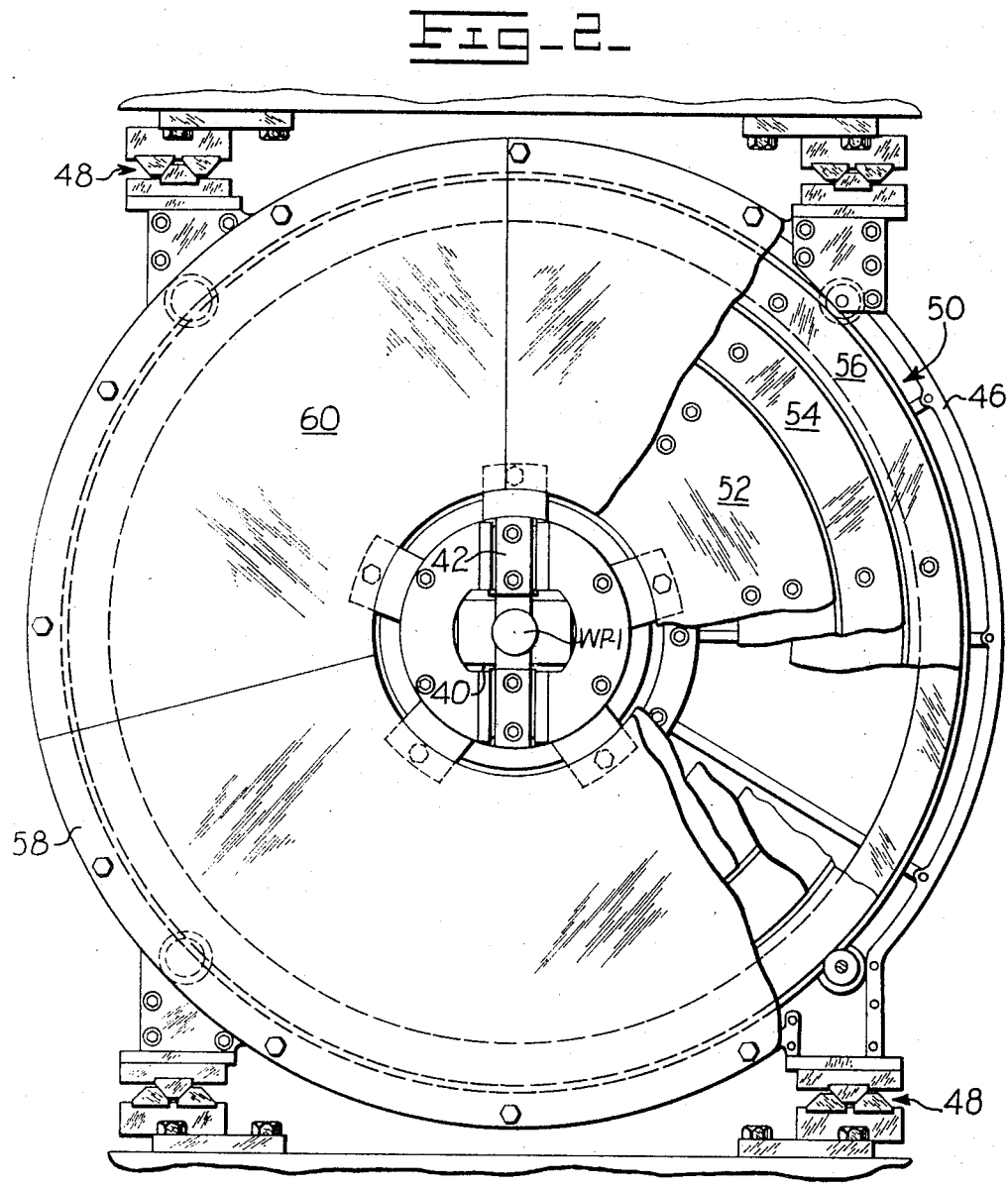
FIG. 2 is a front elevation, partly broken away, illustrating the relationship between a workpiece spindle and a group of inertial flywheel weights.

Referring now to FIG. 2 in conjunction with FIG. 1, a horizontal rotary spindle 40 of an inertial welder has secured at its front face a chuck 42 to clamp and support a part WP-1 for relative rotation with respect to a stationary part on the right-hand end of the machine.

A large cast housing 46 is supported in upper and lower machine guides or ways 48 for reciprocating motion with the spindle and rotary chuck. The housing 46 contains a storage area for the flywheels which are generally indicated at 50. The flywheels per se comprise a plurality of annular or ring shaped elements which are preferably constructed of metal or the like. In the particular embodiment shown, three such annular flywheels 52, 54 and 56 are shown although it is to be understood that any suitable number of such elements could be utilized. Covering the front of the housing is a face plate 58. Face plate 58 has a removable, segmented portion 60 representing substantially a quarter-section for access to the flywheels. When various parts of different sizes are to be bonded on the machine illustrated, it may be necessary to increase or decrease the flywheel inertial energy for each size of part. For example, either all or none of the flywheels 52, 54 or 56 may be used, depending upon the size of the part to be bonded.

Figure 3:
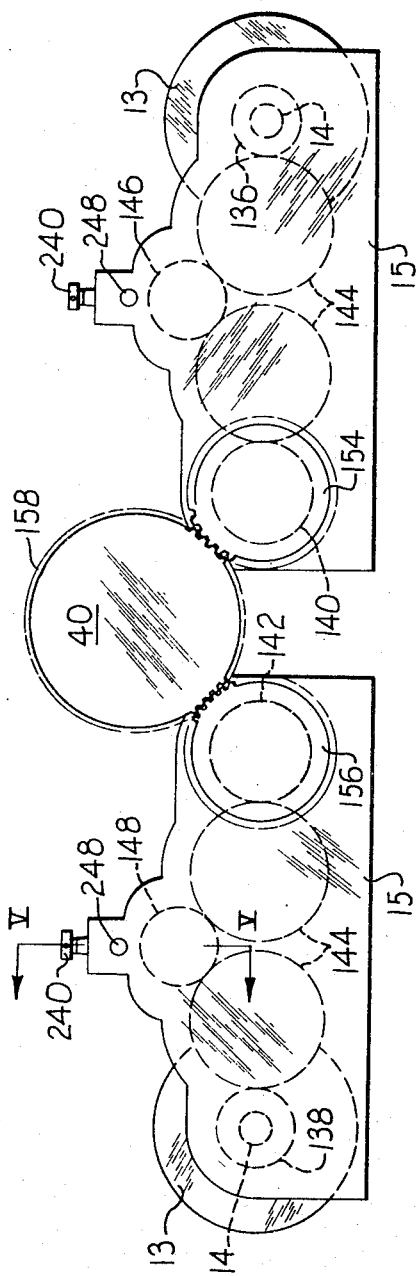
FIG. 3 illustrates a schematic cross-sectional view of a dual drive arrangement for rotating the workpiece spindle.

Referring now to FIGS. 3 and 4, the dual drive arrangement for the spindle, as briefly described above, comprises a pair of motors 12 which are drivingly connected to the input end of a pair of water-cooled eddy-current couplings 13. The output shafts 14 of couplings 13 extend rightwardly into a pair of oppositely disposed transmission housings 15. A pair of gears 136 and 138 are drivingly connected to the ends of shafts 14 and are also drivingly connected to a pair of gears 140 and 142 by means of a plurality of idler gears 144 and a pair of disconnect idlers 146 and 148. The function of the disconnect idler gears 146 and 148 will be described in greater detail at a later point in the description. The gears 140 and 142 are secured to a pair of shafts 150 and 152 respectively which extend rightwardly where they are connected to a pair of gears 154 and 156 disposed in driving relationship with a gear 158. The gear 158 is drivingly connected to the spindle 40 by a suitable spline or key arangement (not shown).

Referring now to FIG. 5, the disconnect gears 146 and 148 of the transmission housing 15 may be manually disengaged from the idler gears 144 to permit one of the motor assemblies 12, etc., to be disconnected from the spindle. As shown in FIG. 5, the gear 148 is slidably mounted on a shaft 238 by a spline connection 236. A rotatable hand control 240 extends through the transmission housing 15 where an eccentrically disposed roller 242 connected to the lower end of the hand control 240 engages a slot 244 in a shifting fork 246. The fork 246 is slidably mounted on a shaft 248 and extends downwardly where its lower bifurcated end 250 engages a groove 252 on the disconnect gear 148. While the disconnect mechanisms have been illustrated as manually operated it is to be understood that either or both could be operated automatically, such as by hydraulic or electrical means.

When the motors 12 have been activated the drive is engaged by energizing the eddy-current couplings 13 to accelerate the machine spindle. When the spindle reaches the desired velocity, the eddy-current couplings 13 are deenergized and the parts WP-1 and WP-2 are brought into contact under pressure. If the entire dual drive mechanism is utilized, it should be noted that all of the following components contribute to the kinetic energy which is available at the weld interface to generate heat by friction: the inertial mass of the driven half of the two eddy-current couplings, the shafts and the gears in transmission housings 15, the gears associated with the spindle, as well as the component parts of the spindle, flywheels 50, and chuck 42.

Since the minimum diameter of a part which can be welded on machines of this type is limited by the minimum kinetic energy stored in the rotating masses, it is desirable that a means be provided to reduce the inertial masses of the rotating components for the bonding of relatively small parts. When smaller parts are to be welded on a machine of the type disclosed, both of the motors 12 are not needed for acceleration of the spindle 40. The reduced horsepower requirement for acceleration of the spindle permits one of the drive motors to be deactivated when the machine is being used for the bonding of relatively small parts.

Either of the disconnect gears 146 and 148 in the transmission housings 15, as previously mentioned and shown in FIG. 5, may be manually disengaged from the idler gears 144 to permit one of the motor assemblies 12, etc., to be disconnected from the spindle. With such an arrangement the operator may, by rotation of the hand control 240, disconnect one of the motor assemblies and reduce the rotating inertial masses associated with the spindle.

It should be additionally noted that if the operator deenergizes one of the motors 12 such that only the other motor is effective to drive spindle 40, he may also further reduce the rotating inertial masses by disengaging one of the gears 146 or 148 from the associated idler gears 144 in one of the transmission housings 15. In this manner the driven half of one of the eddy-current couplings 13, its associated shaft 14, gear 138 (or 136), outer idler 144 and disconnect gear 146 (or 148) are all disconnected from the rotating component such that their inertial mass is not effective in supplying kinetic energy to the weld interface.

Thus, the various disconnect arrangements provided by the apparatus of the present invention make the inertial welder adaptable for the welding of parts having widely varying input energy requirements.

What is claimed is:

1. A multidrive for the spindle of a bonding machine of the kind wherein two parts to be bonded are engaged in rubbing contact at a common interface to heat the interface to a bondable condition, said machine comprising, a plurality of drive motors, means comprising a plurality of disconnect mechanisms selectively connecting said motors to a spindle so that the inertial mass associated with the spindle may be varied to permit the machine to bond parts having a wide range of diameters.

2. Apparatus as set forth in claim 1 wherein said disconnect mechanisms comprise eddy-current couplings interposed between said motors and said spindle.

3. Apparatus as set forth in claim 2 wherein said disconnect mechanisms further comprise multigeared drive trains having means for selectively disengaging one gear from each of said gear trains.

4. A multidrive for an inertial bonding machine of the kind in which end surfaces of two parts to be bonded are pressed together while the stored energy of rotating inertial weights rotates the parts in rubbing contact to heat the engaged surfaces to a plastic weldable condition, said machine comprising, a rotatable and axially movable spindle mounting a chuck for holding one of the parts, multidrive means including a plurality of motors, a plurality of eddy-current couplings connected to said motors, a plurality of transmission drive trains connected to said couplings for rotating said spindle, and means for selectively disconnecting at least one of the elements in each of said drive means.

5. Apparatus as set forth in claim 4 wherein said transmission drive trains comprise multigeared transmissions each having a gear means for rotating said rotary spindle and each having a gear selectively disengageable from said drive train for varying the inertial mass associated with said spindle.

References Cited

UNITED STATES PATENTS 3,269,002    8/1966    Hollander _____ 228—2

RICHARD H. EANES, JR., *Primary Examiner.*